US008520953B2

(12) United States Patent
Shin et al.

(10) Patent No.: US 8,520,953 B2
(45) Date of Patent: Aug. 27, 2013

(54) APPARATUS AND METHOD FOR EXTRACTING EDGES OF IMAGE (75) Inventors: Hyunchul Shin, Ansan-si (KR); Sungchul Jung, Ansan-si (KR); Jeakwon Seo, Ansan-si (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 502 days.

(21) Appl. No.: 12/905,379

(22) Filed: Oct. 15, 2010

(65) Prior Publication Data
US 2011/0293191 A1 Dec. 1, 2011

(30) Foreign Application Priority Data
May 31, 2010 (KR) ........................ 10-2010-0051130

(51) Int. Cl.
*G06K 9/20* (2006.01)
(52) U.S. Cl.
USPC .......................................... 382/199; 382/205
(58) Field of Classification Search
USPC .................................. 382/195, 199, 205, 283
See application file for complete search history.

(56) References Cited

U.S. PATENT DOCUMENTS

| 5,825,922 | A * | 10/1998 | Pearson et al. | 382/199 |
| 8,131,084 | B2 * | 3/2012 | Kim et al. | 382/199 |
| 8,149,465 | B2 * | 4/2012 | Maki | 358/3.27 |
| 8,391,612 | B2 * | 3/2013 | Natroshvili et al. | 382/199 |
| 2003/0179934 | A1 * | 9/2003 | Albertelli et al. | 382/199 |
| 2007/0014482 | A1 * | 1/2007 | Kim et al. | 382/254 |
| 2007/0269113 | A1 * | 11/2007 | Chao | 382/199 |
| 2010/0061638 | A1 * | 3/2010 | Tanaka | 382/199 |
| 2012/0026352 | A1 * | 2/2012 | Natroshvili et al. | 348/222.1 |

FOREIGN PATENT DOCUMENTS

| KR | 1019990062036 A | 7/1999 |
| KR | 100821939 B1 | 4/2008 |
| KR | 1020100009168 A | 1/2010 |

OTHER PUBLICATIONS

Notice of Allowance, issued Jun. 28, 2011, in counterpart Korean Patent Application No. 10-2010-0051130, 5 pgs.
English translation of abstract of Korean Publication No. 100821939 B1, 1 pg.
English translation of abstract of Korean Publication No. 1019990062036 A, 1 pg.
English translation of abstract of Korean Publication No. 1020100009168 A, 1 pg.

* cited by examiner

*Primary Examiner* — John Strege
(74) *Attorney, Agent, or Firm* — Holland & Knight LLP; Brian J. Colandreo; Jeffrey T. Placker (57) ABSTRACT

Provided are an apparatus and method for more accurately extracting edge portions from an image in various conditions. The apparatus includes: a brightness calculation unit calculating a representative brightness value of the neighborhood of a current pixel; a threshold value calculation unit calculating a threshold value, based on which it is determined whether the current pixel is an edge, by using the calculated representative brightness value; a mask application unit calculating a masking value by applying a mask to an area containing at least the current pixel; and an edge determination unit determining whether the current pixel is an edge by comparing the masking value and the threshold value.

18 Claims, 14 Drawing Sheets

PIXELS OF IMAGE

| $p_1$ | $p_2$ | $p_3$ |
|---|---|---|
| $p_4$ | $p_5$ | $p_6$ |
| $p_7$ | $p_8$ | $p_9$ |

HORIZONTAL SOBEL MASK

| -1 | 0 | 1 |
|---|---|---|
| -2 | 0 | 2 |
| -1 | 0 | 1 |

VERTICAL SOBEL MASK

| -1 | -2 | -1 |
|---|---|---|
| 0 | 0 | 0 |
| 1 | 2 | 1 |

|  -1 | 0 | 0 | 0 | 1 |
|-----|---|---|---|---|
|  -2 | 0 | 0 | 0 | 2 |
|  -1 | 0 | 0 | 0 | 1 |

EXTENDED HORIZONTAL SOBEL MASK

| -1 | -2 | -1 |
|----|----|----|
| 0  | 0  | 0  |
| 0  | 0  | 0  |
| 0  | 0  | 0  |
| 1  | 2  | 1  |

EXTENDED VERTICAL SOBEL MASK

FIG. 9a

FIG. 9b

APPARATUS AND METHOD FOR EXTRACTING EDGES OF IMAGE

RELATED APPLICATION

This application claims priority from Korean Patent Application No. 10-2010-0051130 filed on May 31, 2010 in the Korean Intellectual Property Office, the disclosure of which is incorporated herein by reference in its entirety.

BACKGROUND OF THE INVENTION

1. Field of the Invention

The present invention relates to image processing technology, and more particularly, to an apparatus and method for more accurately extracting edge portions from an images in various conditions.

2. Description of the Related Art

The technology of extracting edges from an image is being applied in various image processing related fields. For example, in vision related fields that require edge extraction, general cameras are set up such that when taking photographs, they determine the presence of a person's face by extracting edges and are automatically focused on the person's face. Traffic surveillance systems, which require vehicle extraction from an image, vehicle tracking and recognition, and license plate extraction and recognition, also use edge information extracted by the edge extraction technology. Furthermore, edge extraction technology is essentially used in surveillance cameras, radiology, and other object recognition systems.

An edge is a point at which image brightness changes sharply from a low value to a high value or, conversely, from a high value to a low value. A sharp brightness change at the boundary of an object results in a higher slope value, and a gradual brightness change results in a lower slope value. As a way to extract this brightness change rate, that is, a slope, a differential operation is used. A slope in an image is referred to as a gradient. When the norm (size) of the gradient is greater than a threshold value, the pixel of interest is determined as belonging to an edge portion.

However, because edge extraction techniques based on a differential operator rely on the differential value between pixels for edge extraction, these techniques are insensitive to edges at which brightness changes gently, thus making effective edge extraction difficult. In addition, edge extraction involves an image division process using a threshold value. Here, an inappropriate threshold value directly affects the result of edge extraction. When a low threshold value is used, a lot of edge information can be obtained as a result of edge extraction but it causes an extraction of thick edge lines and high sensitivity to noise. On the other hand, when a high threshold value is used, not all edges can be extracted, resulting in a significant loss of edge information.

Therefore, various methods are being used to determine a threshold value. However, it is a very difficult challenge to find an appropriate threshold value. Using one fixed threshold value may be effective for some areas of an image, but in many cases, not for the entire image. This is because the brightness of the image is not uniform across all areas of the image. Wrongly extracted edges may later adversely affect image recognition performance.

Meanwhile, a method of determining a threshold value according to the condition of an image is available. In this method, a threshold value is determined using a representative value (mean and/or standard deviation) of brightness of an image. Thus, edges can be adaptively extracted from an image that changes over time. However, this method is effective for adaptive edge extraction in regard to time change but ineffective for adaptive edge extraction in regard to various areas of the image. For example, when a threshold value is determined using the mean of brightness of an image, if the brightness of the image is, on the whole, uniform across all areas of the image, appropriate edge extraction is possible. However, if the image has various brightness distributions in its areas, this method is ineffective. That is, using one fixed threshold value for one image may be effective for some areas of the image but ineffective for the entire image since the brightness of the image is not uniform across all areas of the image.

Therefore, a technology, which can adaptively extract an edge according to each brightness area of an image, is required for more effective edge extraction.

SUMMARY OF THE INVENTION

Aspects of the present invention provide an apparatus and method for adaptively extracting an edge according to each brightness area of an image.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an apparatus for extracting edges of an input image by determining whether each pixel that forms the input image is an edge. The apparatus includes: a brightness calculation unit calculating a representative brightness value of the neighborhood of a current pixel; a threshold value calculation unit calculating a threshold value, based on which it is determined whether the current pixel is an edge, by using the calculated representative brightness value; a mask application unit calculating a masking value by applying a mask to an area containing at least the current pixel; and an edge determination unit determining whether the current pixel is an edge by comparing the masking value and the threshold value.

According to another aspect of the present invention, there is provided a method of extracting edges of an input image by determining whether each pixel that forms the input image is an edge. The method includes: calculating a representative brightness value of the neighborhood of a current pixel; calculating a threshold value, based on which it is determined whether the current pixel is an edge, by using the calculated representative brightness value; calculating a masking value by applying a mask to an area containing at least the current pixel; and determining whether the current pixel is an edge by comparing the masking value and the threshold value.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Figure 1:
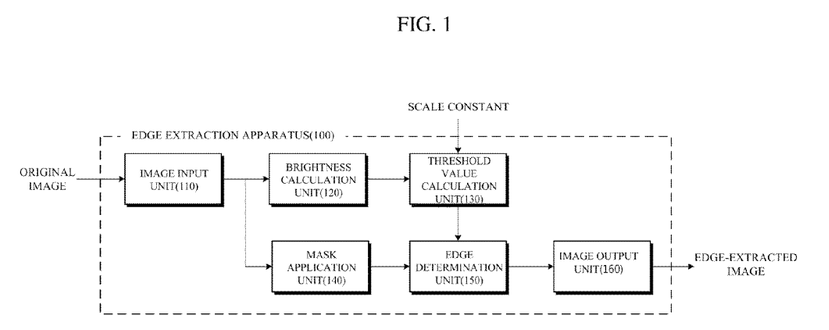
FIG. 1 is a block diagram of an edge extraction apparatus according to an exemplary embodiment of the present invention.

FIG. 1 is a block diagram of an edge extraction apparatus 100 according to an exemplary embodiment of the present invention. The edge extraction apparatus 100 extracts edges of an input image by determining whether each pixel that forms the input image is an edge. In particular, for adaptive edge extraction according to ambient brightness, the edge extraction apparatus 100 uses a relatively low threshold value for a dark area and a relatively high threshold value for a bright area. Specifically, the edge extraction apparatus 100 may include an image input unit 110, a brightness calculation unit 120, a threshold value calculation unit 130, a mask application unit 140, an edge determination unit 150, and an image output unit 160.

The image input unit 110 receives an image whose edges are to be extracted. The image may be an image captured by a camera installed in the edge extraction apparatus 100, an image stored in a memory, or an image received over a network.

The brightness calculation unit 120 calculates a representative brightness value of the neighborhood of a current pixel. Here, the mean or median brightness value of pixels (eight or more pixels) surrounding the current pixel may simply be used as the representative brightness value of the neighborhood of the current pixel. However, for more accurate edge extraction, the current pixel and its neighboring pixels need to be matched respectively with cells of a mask that is to be applied by the mask application unit 140.

In the current exemplary embodiment of the present invention, the brightness calculation unit 120 obtains a first reference value by multiplying values of pixels located on a side of the current pixel respectively by values of corresponding cells of the mask and adding the multiplication results. In addition, the brightness calculation unit 120 obtains a second reference value by multiplying values of pixels located on the other side of the current pixel respectively by values of corresponding cells of the mask and adding the multiplication results. Then, the brightness calculation unit 120 calculates the representative brightness value based on the first reference value and the second reference value. Examples of the mask (edge extraction mask) include Sobel, Robert, Prewitt, Preichen, stochastic, and Laplacian masks. The present invention will be described based on the Sobel mask which is the most widely used mask.

Figure 2:
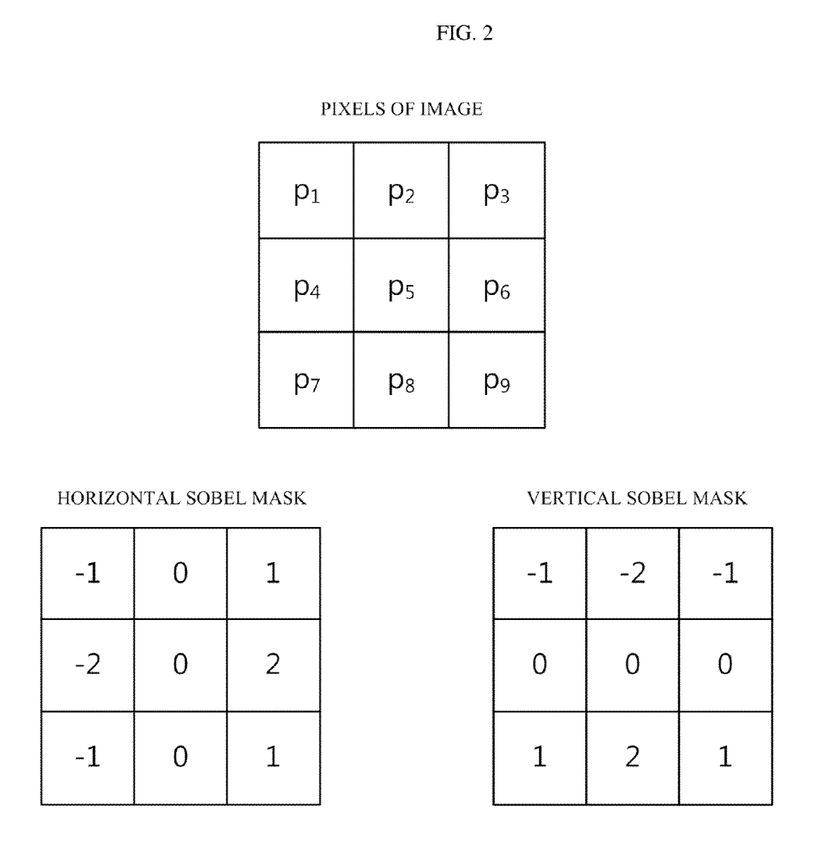
FIG. 2 is a diagram illustrating a Sobel mask and the relationship between a current pixel and its neighboring pixels.

A Sobel mask is basically classified into a horizontal Sobel mask and a vertical Sobel mask, as shown in FIG. 2. When eight pixels surround a current pixel $p_5$ of the input image, the nine pixels including the current pixel $p_5$ correspond respectively to cells of the Sobel mask.

In the case of the horizontal Sobel mask, a first reference value is obtained by multiplying values of pixels $p_1$, $p_4$ and $p_7$ located on the left side of the current pixel $p_5$ respectively by values (−1, −2, −1) of corresponding cells of the horizontal Sobel mask, adding the multiplication results, and taking an absolute value of the addition result. That is, the first reference value is $p_1+2p_4+p_7$. In addition, a second reference value is obtained by multiplying values of pixels $p_3$, $p_6$ and $p_9$ located on the right side of the current pixel $p_5$ respectively by values (1, 2, 1) of corresponding cells of the horizontal Sobel mask, adding the multiplication results, and taking an absolute value of the addition result. That is, the second reference value is $p_3+2p_6+p_9$.

In the case of the vertical Sobel mask, a first reference value is obtained by multiplying values of pixels $p_1$, $p_2$ and $p_3$ located on the upper side of the current pixel $p_5$ respectively by values (−1, −2, −1) of corresponding cells of the horizontal Sobel mask, adding the multiplication results, and taking an absolute value of the addition result. That is, the first reference value is $p_1+2p_2+p_3$. In addition, a second reference value is obtained by multiplying values of pixels $p_7$, $p_8$ and $p_9$ located on the lower side of the current pixel $p_5$ respectively by values (1, 2, 1) of corresponding cells of the horizontal Sobel mask, adding the multiplication results, and taking an absolute value of the addition result. That is, the second reference value is $p_7+2p_8+p_9$.

Then, the brightness calculation unit 120 compares the first reference value with the second reference value and determines a larger value as the representative brightness value of the neighborhood of the current pixel $p_5$. A representative brightness value obtained using a mask as described above ensures more reliable edge extraction, compared with a simple mean brightness value.

The threshold value calculation unit 130 calculates a threshold value, based on which it is determined whether the current pixel is an edge, by using the representative brightness value calculated by the brightness calculation unit 120. Specifically, the threshold value calculation unit 130 calculates the threshold value by multiplying the calculated representative brightness value by a predetermined scale constant. The scale constant can be experimentally obtained. However, a value of approximately 0.2 may be used as the scale constant. Instead of being simply multiplied by the scale constant, the calculated representative brightness value may be squared or cubed and then multiplied by the scale constant.

Figure 3:
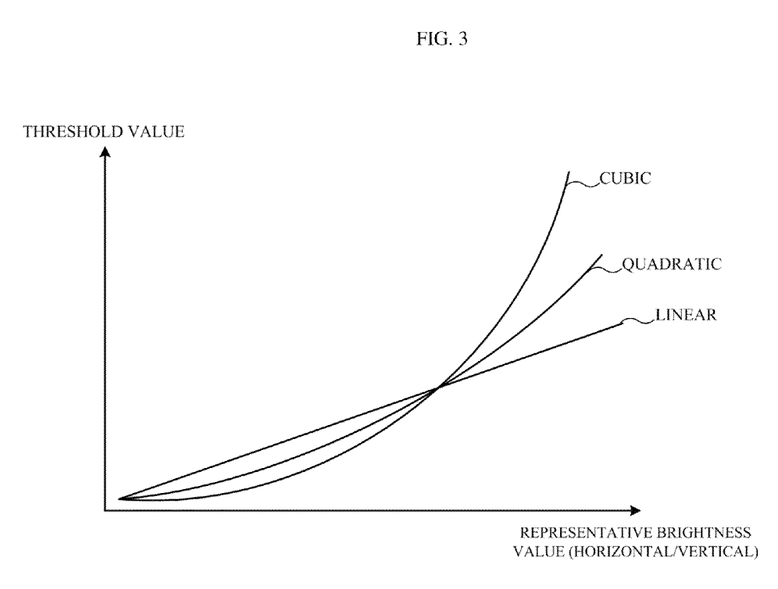
FIG. 3 is a graph illustrating the relationship between a representative brightness value calculated by a brightness calculation unit and a threshold value.

FIG. 3 is a graph illustrating the relationship between a representative brightness value calculated by the brightness calculation unit 120 and a threshold value. Referring to the graph of FIG. 3, the threshold value is more sensitive to the result of multiplying the square (a quadratic curve) or cube (a cubic curve) of the representative brightness value by a scale constant than to the representative brightness value as it is (linear). In any case, the threshold value monotone increases as the representative brightness value increases.

The mask application unit 140 obtains a masking value by applying a mask to an area containing at least the current pixel. As described above, examples of the mask include Sobel, Robert, Prewitt, Preichen, stochastic, and Laplacian masks. The following description is based on a case where a Sobel mask with 3×3 cells is used.

Figure 4:
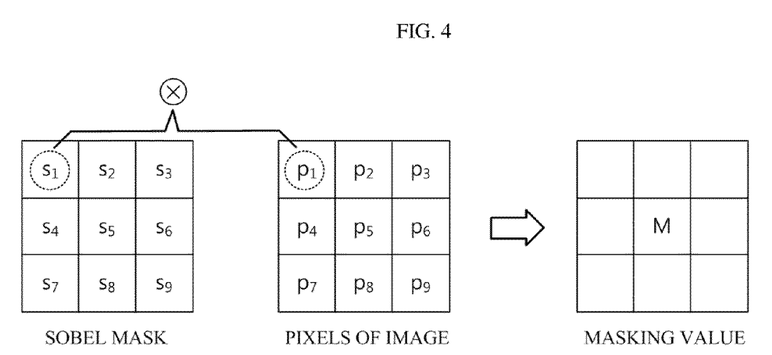
FIG. 4 is a diagram illustrating the process of obtaining a masking value by applying a mask.

FIG. 4 is a diagram illustrating the process of obtaining a masking value by applying a mask. To perform a masking operation on a current pixel $p_5$ of an image, nine pixels with the current pixel $p_5$ at the center are used. Values of these nine pixels are respectively multiplied by values of nine corresponding cells of a Sobel mask, and the multiplication results are added to yield a result value M. That is, the result value M may be given by Equation 1.

$$M = \sum_{i=1}^{9} (s_i \times p_i), \tag{1}$$

where each of $s_1$ through $s_9$ has different values for a horizontal Sobel mask and a vertical Sobel mask. Specific values of each of $s_1$ through $s_9$ for the horizontal Sobel mask and the vertical Sobel mask are as described above with reference to FIG. 2. Ultimately, one result value M is obtained for each of a horizontal direction and a vertical direction. The result value M for the horizontal direction may be indicated by $G_x$, and the result value M for the vertical direction may be indicated by $G_y$.

Therefore, a masking value G should be calculated based on these two result values. The masking value G is typically calculated by adding the result value $G_x$ which is obtained by applying a vertical mask to a current pixel to the result value $G_y$ which is obtained by applying a horizontal mask to the current pixel, as in Equation 2. Here, the term "adding" is a concept that encompasses various types of additions from adding the squares of the result values $G_x$ and $G_y$ and extracting the square root of the addition result as in Equation 2 to simply adding the result values $G_x$ and $G_y$ or adding absolute values of the result values $G_x$ and $G_y$.

$$G = \sqrt{G_x^2 + G_y^2} \tag{2}$$

The edge determination unit 150 compares the masking value G with the threshold value. If the masking value G exceeds the threshold value, the edge determination unit 150 determines that the current pixel is an edge. If not, the edge determination unit 150 determines that the current pixel is not an edge. As for the threshold value, a relatively low value is selected for a dark area, and a relatively high value is selected for a bright area through the calculation processes of the brightness calculation unit 120 and the threshold value calculation unit 130, thereby making adaptive edge determination possible. This edge determination process is iteratively performed until all pixels of an image are determined.

When the edge determination process for one entire image is completed, an edge-extracted image is obtained. The image output unit 160 outputs (displays, transmits, stores, or the like) the edge-extracted image from the edge extraction apparatus 100.

Figure 5A:
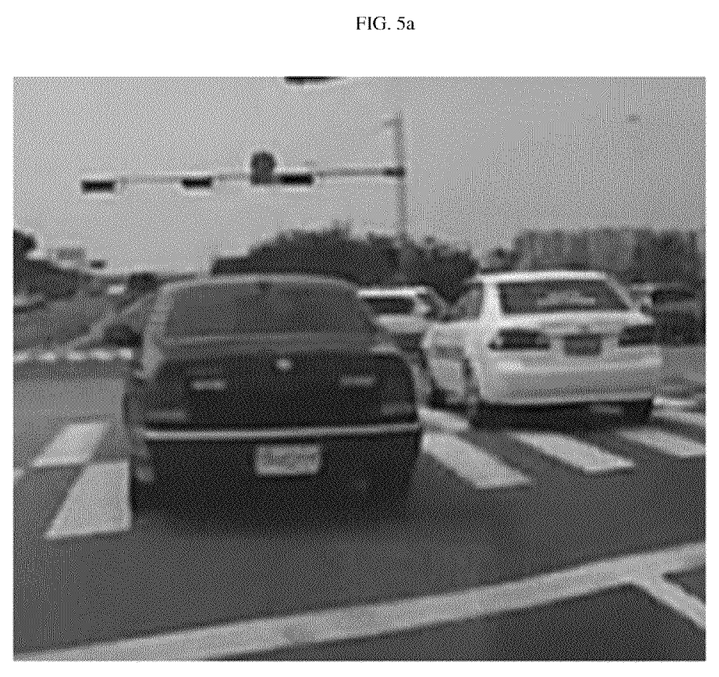
FIGS. 5A through 5E show images for comparing effects of the present invention and conventional arts.
Figure 5B:
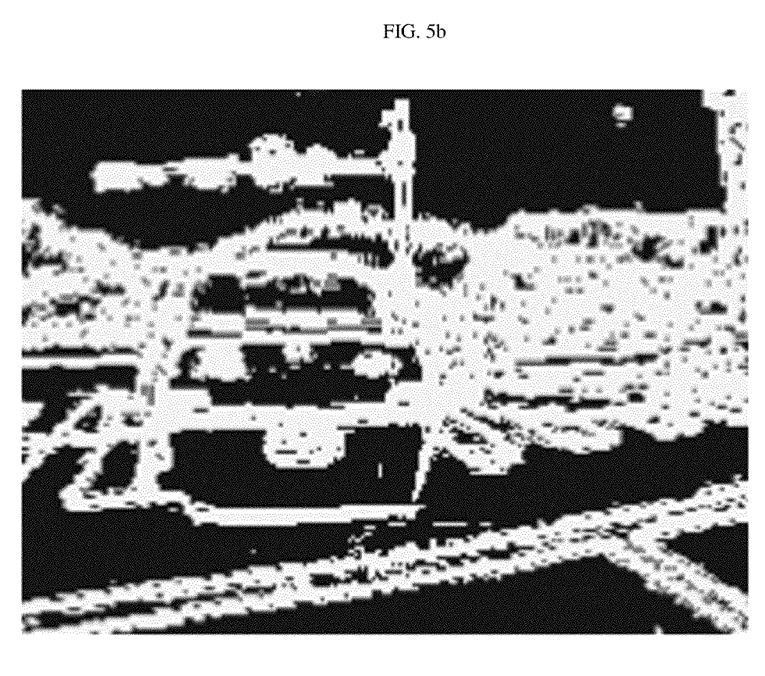
Figure 5C:
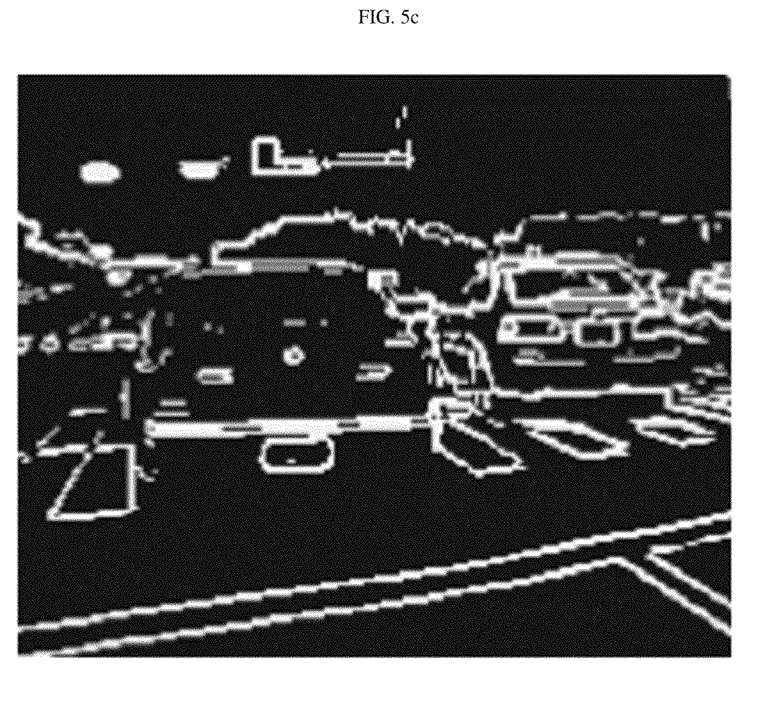
Figure 5D:
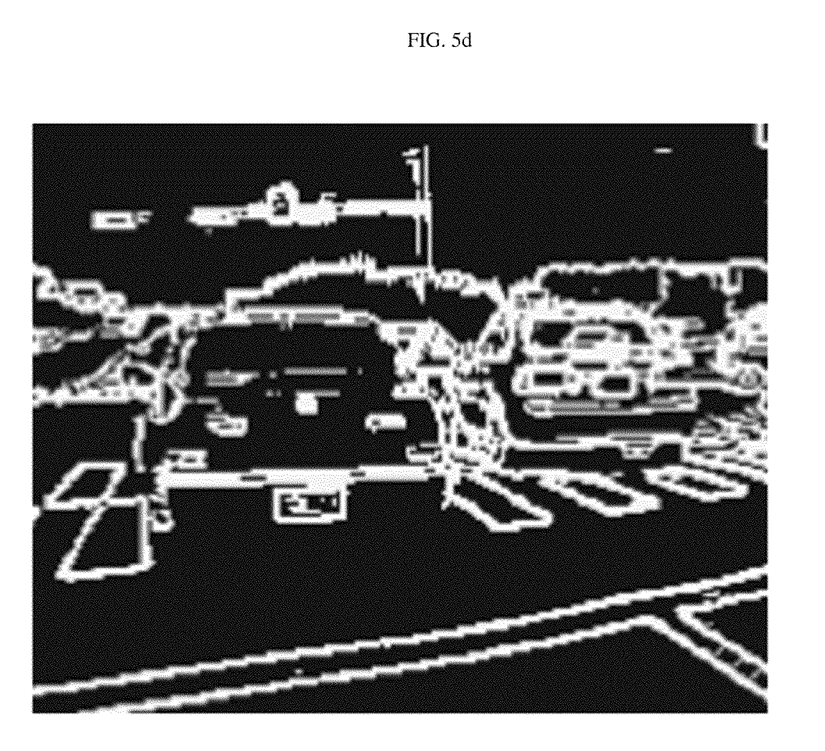
Figure 5E:
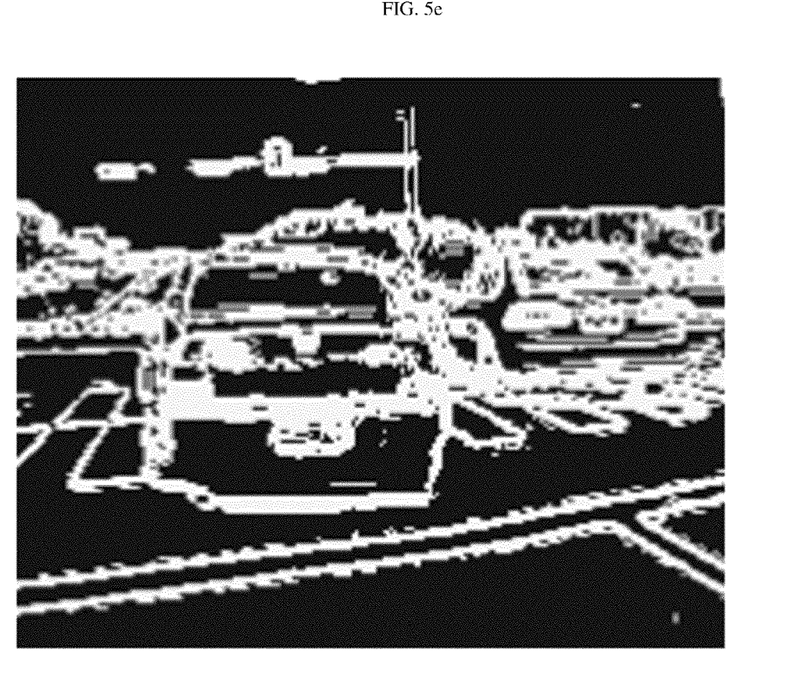

FIGS. 5A through 5E show images for comparing effects of the above-described present invention and conventional arts. In detail, FIG. 5A shows an original image, and FIGS. 5B and 5C show images obtained by applying a general Sobel mask and fixing a threshold value to 30 and 200. FIG. 5D shows an image obtained by setting a threshold value using the mean and standard deviation of the entire original image. FIG. 5E shows an image obtained according to an exemplary embodiment of the present invention. The edges around the bright regions (lamps) as well as the edges around the dark regions are extracted with good quality.

In the case of FIG. 5B, since a low threshold value was used to detect edges of dark areas, the edges of the dark areas could be easily detected. Accordingly, even the edges of shadows under vehicles are shown in the image of FIG. 5B. However, the image contains many edges resulting from noise, and the edges in the image are excessively thick. In the case of FIG. 5C, since a significantly high threshold value was used, edges were not detected in many areas.

In the case of FIG. 5D, an appropriate threshold value was determined using the mean and the standard deviation. Thus, the image of FIG. 5D shows, on the whole, superior edge detection results. However, the shadows (i.e., dark areas) under the vehicles are not shown well.

On the other hand, the image of FIG. 5E shows, on the whole, superior edge detection results. The edges of the shadows (i.e., dark areas) of the vehicles are clearly shown in the image, and the image does not contain much noise.

Meanwhile, some edges contained in an image may not be easily detected by a general Sobel filter because brightness gradually changes across boundary lines at these edges.

Figure 6:
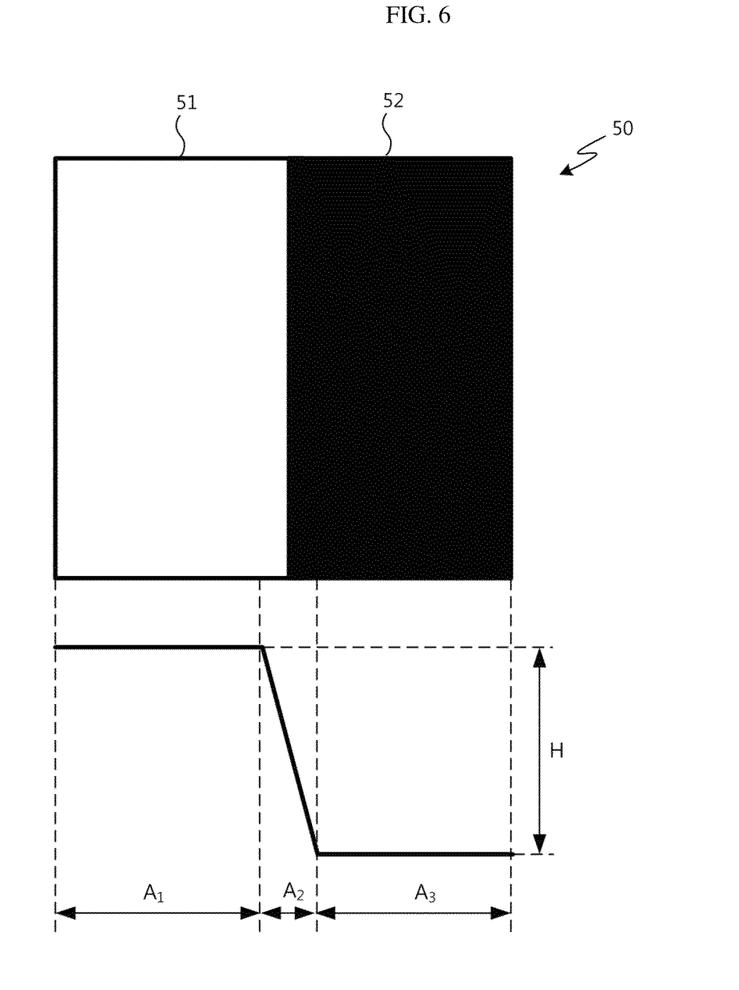
FIG. 6 is a diagram illustrating a case where the brightness of an image sharply changes at an edge.

FIG. 6 is a diagram illustrating a case where the brightness of an image 50 sharply changes at an edge. The image 50 is divided into a bright area 51 and a dark area 52 by a boundary line. In this case, if a current pixel corresponds to a section $A_2$, a result value obtained by applying a mask may be a value approximately equal to a gradient H. Accordingly, the current pixel can be easily detected as an edge.

Figure 7:
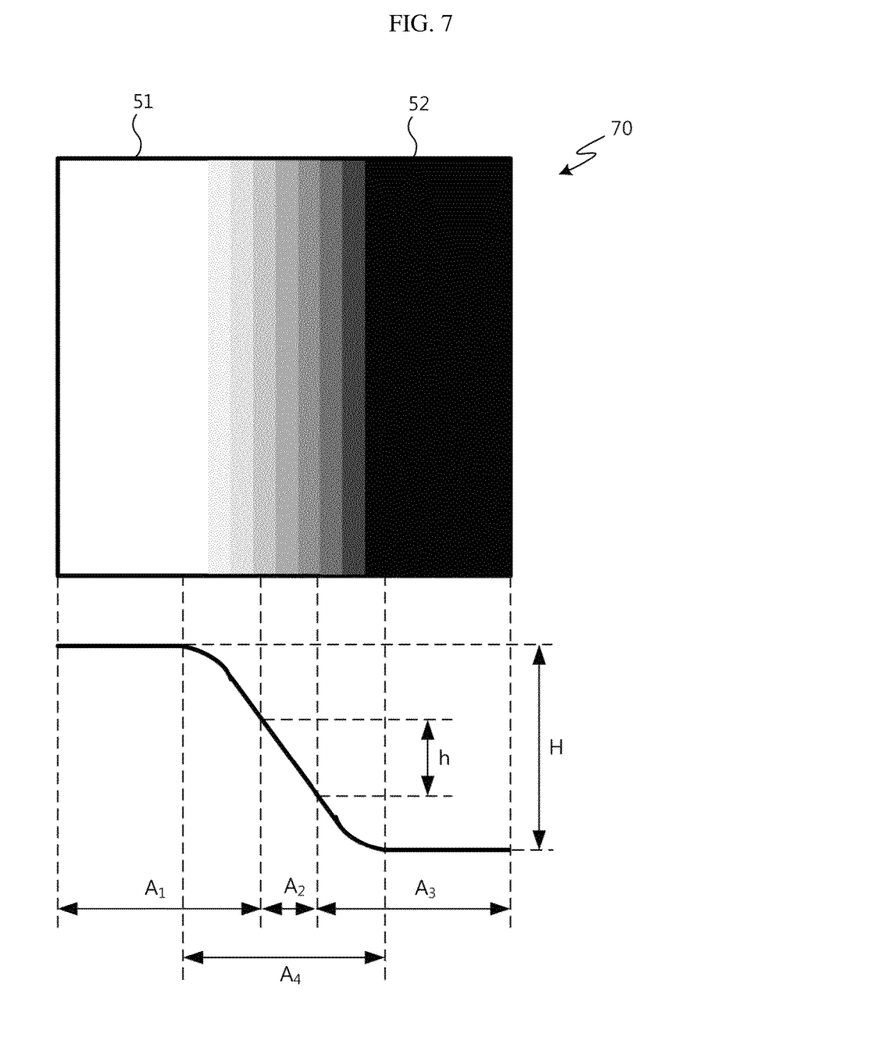
FIG. 7 is a diagram illustrating a case where the brightness of an image gently changes at an edge.

However, in the case of an image 70 in which brightness gently changes at an edge, the value of a gradient h of a section $A_2$ corresponding to a current pixel may not be high enough to exceed a threshold value. Accordingly, even if the current pixel should be determined to be an edge portion, it may not be so. Hence, the above-described embodiment of the present invention, that is, a general 3×3 Sobel mask may be inadequate in this case.

Figure 8:
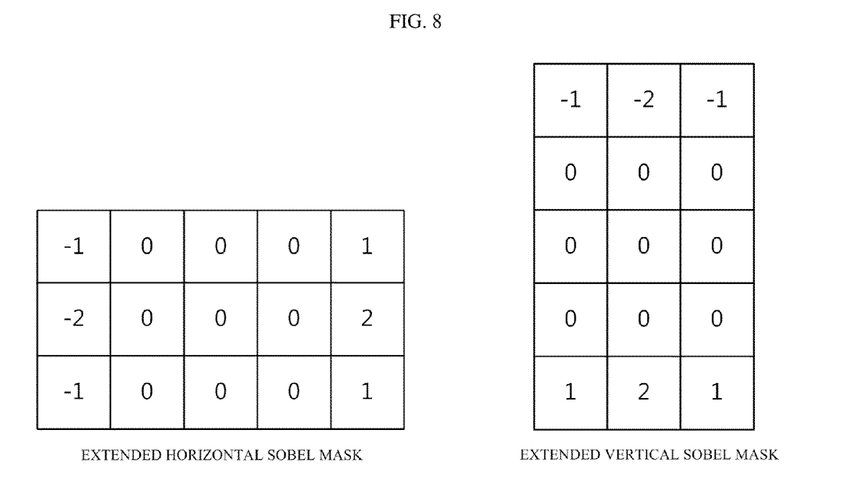
FIG. 8 is a diagram illustrating an extended Sobel mask according to an exemplary embodiment of the present invention.

In view of the above fact, in another exemplary embodiment of the present invention, the mask may include a horizontal mask which has been horizontally extended and a vertical mask which has been vertically extended. For example, as shown in FIG. 8, the horizontal mask may have 3×5 cells, and the vertical mask may have 5×3 cells. A more extended mask with, e.g., 3×7 or 7×3 cells can also be used. However, since excessive extension increases the risk of determining a non-edge portion as an edge, a mask with 3×5 or 5×3 cells is appropriate.

Here, all cells added to an original mask by the extension have a value of zero. When such an extended Sobel mask is used, a section occupied by a current pixel is extended from $A_2$ to $A_4$ in FIG. 7. That is, the gradient of the current pixel increases to a sufficiently high value (H), thereby raising the probability that the current pixel will be determined to be an edge. The use of an extended mask enables adaptive edge extraction from images having edge regions in which brightness gradually changes.

Figure 9A:
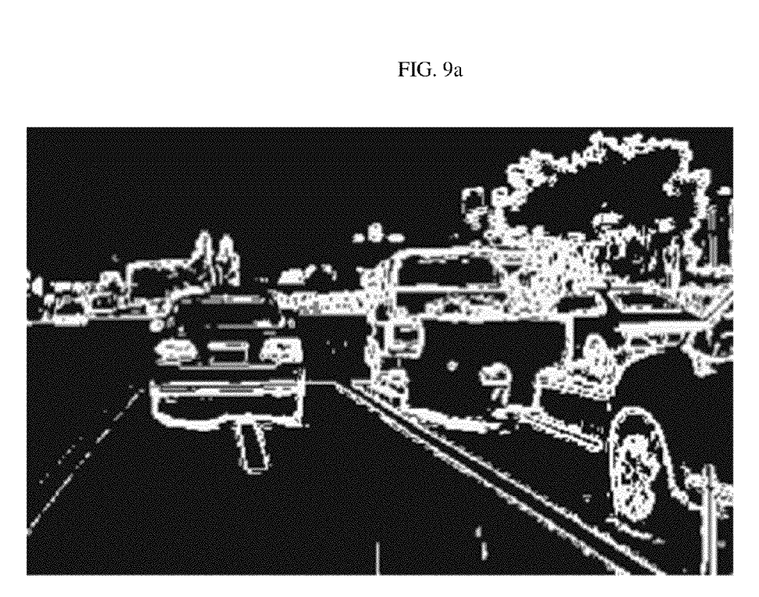
FIGS. 9A and 9B respectively show an image obtained using a 3×3 Sobel mask and an image obtained using a 3×5 or 5×3 Sobel mask, according to the present invention.
Figure 9B:
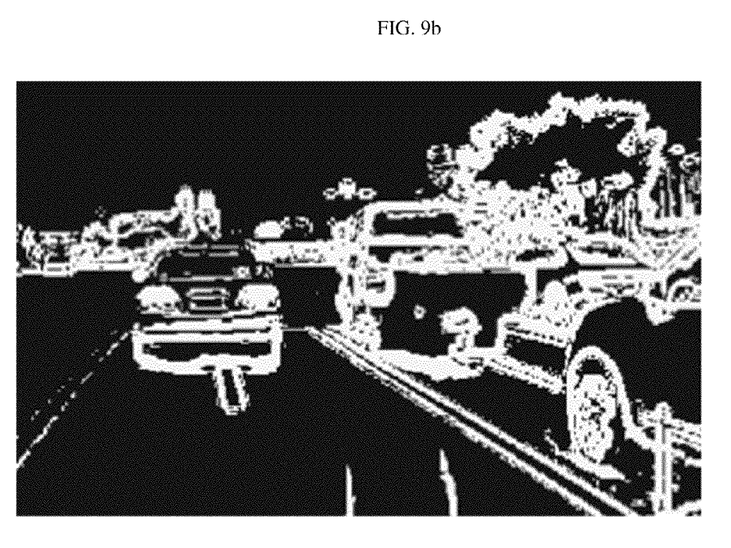

FIGS. 9A and 9B respectively show an image obtained using a 3×3 Sobel mask and an image obtained using a 3×5 or 5×3 Sobel mask, according to the present invention. The image of FIG. 9B shows better edge extraction results in areas in which brightness gradually changes (for example, reflected surfaces of a road) than the image of FIG. 9A.

The present invention can better extract edges from an image, which includes bright and dark areas, compared with conventional edge extraction technologies.

According to the present invention, edges, which cannot be extracted using a general mask since brightness gradually changes at these edges, can be clearly extracted from an image.

Each component of FIG. 1 means, but is not limited to, software or hardware, such as a field programmable gate array (FPGA) or application specific integrated circuit (ASIC). A component may advantageously be configured to reside on the addressable storage medium and configured to execute on one or more processors. The functionality provided for in the components may be further separated into additional components or may be combined into a single component which performs certain tasks.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An apparatus for extracting edges of an input image by determining whether each pixel that forms the input image is an edge, the apparatus comprising:
    a brightness calculation unit calculating a representative brightness value of the neighborhood of a current pixel;
    a threshold value calculation unit calculating a threshold value, based on which it is determined whether the current pixel is an edge, by using the calculated representative brightness value;
    a mask application unit calculating a masking value by applying a mask to an area containing at least the current pixel; and
    an edge determination unit determining whether the current pixel is an edge by comparing the masking value and the threshold value.

2. The apparatus of claim 1, wherein the mask is a Sobel mask with 3×3 cells.

3. The apparatus of claim 1, wherein the masking value is calculated by adding a result value which is obtained by applying a horizontal mask to the current pixel to a result value which is obtained by applying a vertical mask to the current pixel.

4. The apparatus of claim 1, wherein the threshold value calculation unit calculates the threshold value by multiplying the calculated representative brightness value by a predetermined scale constant.

5. The apparatus of claim 1, wherein the brightness calculation unit calculates the representative brightness value based on a first reference value, which is obtained by multiplying values of pixels located on a side of the current pixel respectively by values of corresponding cells of the mask and adding the multiplication results, and a second reference value which is obtained by multiplying values of pixels located on the other side of the current pixel respectively by values of corresponding cells of the mask and adding the multiplication results.

6. The apparatus of claim 5, wherein the representative brightness value is a larger one of the first reference value and the second reference value.

7. The apparatus of claim 1, wherein the mask comprises a horizontal mask which has been horizontally extended and a vertical mask which has been vertically extended.

8. The apparatus of claim 7, wherein the horizontal mask has 3×5 cells, and the vertical mask has 5×3 cells.

9. The apparatus of claim 7, wherein all cells added to an original mask by the extension have a value of zero.

10. A method of extracting edges of an input image by determining whether each pixel that forms the input image is an edge, the method comprising:
    calculating a representative brightness value of the neighborhood of a current pixel;
    calculating a threshold value, based on which it is determined whether the current pixel is an edge, by using the calculated representative brightness value;
    calculating a masking value by applying a mask to an area containing at least the current pixel; and
    determining whether the current pixel is an edge by comparing the masking value and the threshold value.

11. The method of claim 10, wherein the mask is a Sobel mask with 3×3 cells.

12. The method of claim 10, wherein the masking value is calculated by adding a result value which is obtained by applying a horizontal mask to the current pixel to a result value which is obtained by applying a vertical mask to the current pixel.

13. The method of claim 10, wherein the calculating of the threshold value comprises calculating the threshold value by multiplying the calculated representative brightness value by a predetermined scale constant.

14. The method of claim 10, wherein the calculating of the representative brightness value comprises calculating the representative brightness value based on a first reference value, which is obtained by multiplying values of pixels located on a side of the current pixel respectively by values of corresponding cells of the mask and adding the multiplication results, and a second reference value which is obtained by multiplying values of pixels located on the other side of the current pixel respectively by values of corresponding cells of the mask and adding the multiplication results.

15. The method of claim 14, wherein the representative brightness value is a larger one of the first reference value and the second reference value.

16. The method of claim 10, wherein the mask comprises a horizontal mask which has been horizontally extended and a vertical mask which has been vertically extended.

17. The method of claim 16, wherein the horizontal mask has 3×5 cells, and the vertical mask has 5×3 cells.

18. The method of claim 16, wherein all cells added to an original mask by the extension have a value of zero.

* * * * *